US010026222B1

(12) United States Patent
Morrison et al.

(10) Patent No.: US 10,026,222 B1
(45) Date of Patent: Jul. 17, 2018

(54) THREE DIMENSIONAL TRAFFIC VIRTUAL CAMERA VISUALIZATION

(71) Applicant: TWC PATENT TRUST LLT, Burlington, VT (US)

(72) Inventors: Shane Morrison, Andover, MA (US); Bradford Pechacek, Andover, MA (US); Serhiy Likhanov, North Andover, MA (US)

(73) Assignee: TWC PATENT TRUST LLT, Burlington, VT (US)

( * ) Notice: Subject to any disclaimer, the term of this patent is extended or adjusted under 35 U.S.C. 154(b) by 0 days.

(21) Appl. No.: 15/095,575

(22) Filed: Apr. 11, 2016

Related U.S. Application Data

(60) Provisional application No. 62/145,159, filed on Apr. 9, 2015.

(51) Int. Cl.
*G06T 17/05* (2011.01)
*G06T 15/04* (2011.01)
*G06T 7/00* (2017.01)

(52) U.S. Cl.
CPC .............. *G06T 17/05* (2013.01); *G06T 7/004* (2013.01); *G06T 7/0085* (2013.01); *G06T 15/04* (2013.01); *G06T 2207/10032* (2013.01); *G06T 2207/30181* (2013.01); *G06T 2207/30236* (2013.01)

(58) Field of Classification Search
CPC .............. G06T 17/05; G06F 17/30241; G06F 2221/2111
See application file for complete search history.

(56) References Cited

U.S. PATENT DOCUMENTS

| | | | | |
|---|---|---|---|---|
| 6,011,494 | A * | 1/2000 | Watanabe | G01C 21/3635 340/990 |
| 7,230,640 | B2 * | 6/2007 | Regensburger | G01S 13/931 348/115 |
| 2002/0154174 | A1 * | 10/2002 | Redlich | G06F 17/30873 715/848 |
| 2008/0051989 | A1 * | 2/2008 | Welsh | G06T 11/00 701/532 |
| 2012/0274633 | A1 * | 11/2012 | Ivanov | G01C 21/32 345/419 |

* cited by examiner

*Primary Examiner* — Said Broome
(74) *Attorney, Agent, or Firm* — Meunier Carlin & Curfman LLC

(57) ABSTRACT

Systems and methods for creating high-resolution virtual-camera traffic visualizations. The visualizations appear as if a camera is present along a roadway at a location of interest and realistically depicts traffic flow at a particular time. Thus, the visualizations are able to provide viewers a realistic view of what traffic conditions are like at the location of interest. While various descriptions will provided with regard to traffic flow, the principles described herein may be used to create visualizations of other "flows," such as in-flight aircraft, ground control systems at airports, etc.

10 Claims, 7 Drawing Sheets

THREE DIMENSIONAL TRAFFIC VIRTUAL CAMERA VISUALIZATION

CROSS-REFERENCE TO RELATED APPLICATION

This application claims priority to U.S. Provisional Patent Application No. 62/145,159, filed Apr. 9, 2015, entitled "THREE DIMENSIONAL TRAFFIC VIRTUAL CAMERA VISUALIZATION," which is incorporated herein by reference in its entirety.

BACKGROUND

Presentation of traffic information, for example, by television stations on their main on-air channel, web, and mobile platforms is limited to map-based, color-coded traffic "flow" data. The data is encoded using 3-5 colors, where typically a shade of green is used to show free flowing traffic, yellow is used to show impeded flow, red is used for stop-and-go traffic. Other colors may be used to depict closed roads. In addition to color-coded flow information, traffic incidents such as accidents, first responder activity, construction, and the like are depicted using two or three-dimensional icons that can be queried interactively by on-air talent to identify ancillary information related to the incident that cannot be ascertained simply by viewing the icon. Television stations often supplement their visual displays with drive time graphs and displays for recognized driving routes, video from fixed traffic cameras, and helicopter reports.

Existing traffic presentations suffer from a number of shortcomings. For example, there is a great expense associated with establishing and maintaining a traffic camera network. Even with dense camera coverage, only a relatively small percentage of the station's designated market area (DMA) can be covered. Helicopters, while providing perhaps the best view of the current traffic situation, are often prohibitively expensive, especially for smaller markets where advertising revenue is substantially less than major markets. A helicopter also suffers from the inability to cover the entire market, especially if it is a geographically expansive area or if weather conditions are unfavorable. Beyond the expense of traditional traffic enhancements such as cameras and helicopters, the basic flow and incident information can also be confusing to the viewer, even when color-coding and icons are properly explained and include an on-air key.

SUMMARY

Disclosed herein are systems and methods for providing a three-dimensional (3D) visualization of a predetermined location. An example method for creating a three-dimensional (3D) visualization of a geographic location includes receiving GIS data that contains roadway information within the geographic location; receiving earth imagery associated with the geographic location; and for each distinct zoom level, defining a road geometry from the roadway information in accordance with the distinct zoom level and compositing the road geometry and earth imagery into a zoom-level specific 3D visualization that is stored in a respective tile. The respective tiles associated with each distinct zoom level are composited into a tiled file to provide multiple zoom levels for the 3D visualization of the geographic area.

Another example method of the present disclosure includes presenting dynamic information in a three-dimensional (3D) visualization of a geographic location. The method may include loading a tiled file where each tile represents the 3D visualization of the geographic location at a distinct zoom level; determining at least one information element to be displayed in the 3D visualization as the dynamic information; and presenting the dynamic information in the 3D visualization.

Yet another example method of the present disclosure includes creating and presenting a three-dimensional (3D) visualization of a geographic location that contains dynamically changing information. The method may include creating static representations of the 3D visualization that includes map imagery and earth imagery associated with the geographic location, each static representation being a distinct zoom level associated with the geographic area; receiving a selection of a zoom level of the geographic area to be displayed as the 3D visualization; determining at least one information element to be displayed in the 3D visualization as the dynamically changing information; modeling a behavior of the at least one information element; and presenting modeled behavior in the 3D visualization as the dynamically changing information.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
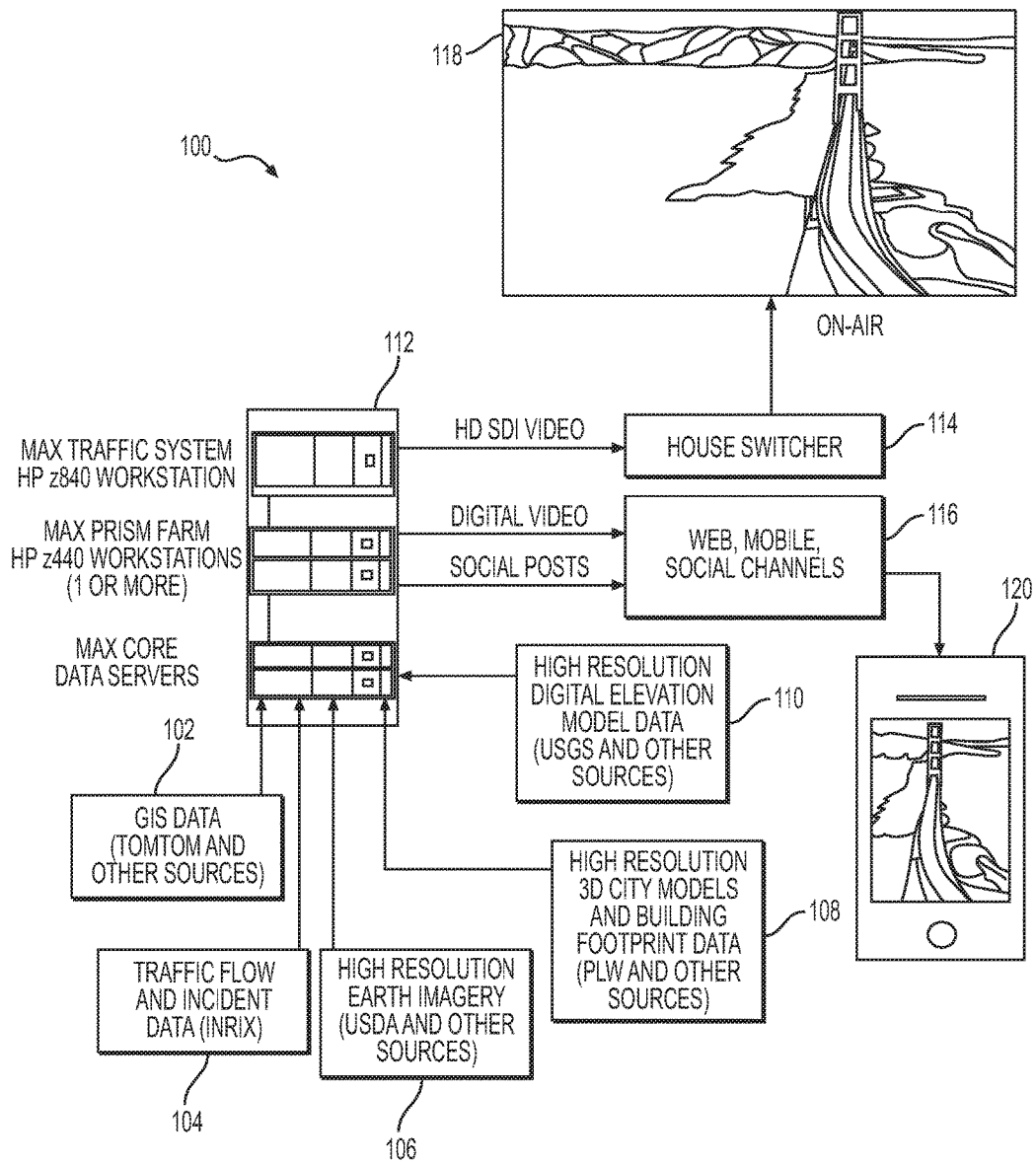
FIG. 1 illustrates an example environment in which aspects of the present disclosure may be implemented.

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for providing 3D visualizations having dynamically changing information, it will become evident to those skilled in the art that the implementations are not limited thereto.

OVERVIEW OF THE DISCLOSURE

The present disclosure is directed to systems and methods for creating high-resolution virtual-camera traffic visualizations. The visualizations appear as if a camera is present along a roadway at a location of interest and realistically depict traffic flow at a particular time. Thus, the visualizations are able to provide viewers a visualization of what traffic conditions are at the location of interest. While various descriptions will provided with regard to traffic flow, the principles described herein may be used to create visualizations of other "flows," such as in-flight aircraft, ground control systems at airports, etc.

The subject matter of the present disclosure may be used to supplement and/or replace traditional traffic flows, incident icons, traffic cameras, and drive time information with a virtual view or representation of what drivers will actually see when on the road. This allows the presentation to be much more easily understood and provides a much richer and usable set of traffic information that can be easily consumed by the viewer. The present disclosure further offers television and cable stations a "must see" presentation that will attract viewers, keep them watching longer, and improve viewer loyalty.

As will be described below, a feature of the present disclosure is a "Virtual Camera" that can be interactively placed anywhere in the station's designated market area (DMA). Once placed, the Virtual Camera opens a three-dimensional (3D) visualization (window) of the traffic conditions at that location, complete with real-looking vehicles, roads, road signs, and high resolution mapping. In an implementation, GIS information from, e.g., TomTom defines actual roads in the 3D visualization and traffic flow and incident information is used from, e.g., INRIX, as a data input to drive density, speed, acceleration, and deceleration of the vehicles along the roads. Other databases may supply signage data that is used to show information on changeable signs displayed in the 3D visualization. Drive time information for key routes may be derived from the INRIX data and may also be placed on virtual drive-time signs. Sponsorship logos can be placed on embedded billboards, or even on moving virtual vehicles, to mimic what is seen in the real world. Still further, the virtual camera visualization can also include real-time observed or forecast weather information, including a visualization of the sky and precipitation situation, all adding the realism of the presentation.

EXAMPLE IMPLEMENTATION

With reference to FIG. 1, there is illustrated an example environment 100 in which the present disclosure may be implemented. As will be described, various sources of information may be combined to synthesize the virtual-camera traffic visualizations of the present disclosure. The sources may include, but are not limited to geographic information system (GIS) data 102, traffic flow and incident data 104, earth imagery 106, city and building models 108, and elevation model data 110. The resulting interactive 3D visualizations created from the data may include both static and dynamic information. For example, static data may include buildings, roadways and bodies of water. The dynamic data may include CCTV, variable sign messages, and detector data feeds. As such, it is understood that the dynamic information is perishable, thus should be rapidly ingested and processed into the interactive 3D visualizations.

The GIS data 102 is a database of special information, such as street networks with names, classes, ramp restrictions, toll information, exit signage, etc. Other attributes may be included, such as indications of one-way streets, restricted turns, construction areas, and overpasses. It also gives you added functionality such as turn-by-turn directions, road signage, intersections, positioning center lines for drivable roads and streets. The GIS data 102 may be information supplied by TomTom International BV.

The traffic flow and incident data 104 is a database of dynamic data, including but not limited to, real-time traffic, incident, video, and weather data. Real-time traffic and incident data may be obtained from regional authorities and may include point sensor data (e.g., speed and volume), incident information (e.g., accidents, construction, disabled vehicles), incident response information (e.g., police, fire, rescue), lane closure information, dynamic message signs data, weather information, automatic vehicle location (AVL), and CCTV video. The information may be temporal in nature and change depending on conditions. As will be discussed below, incident data may be used to dynamically visualize relative traffic speeds on a per-lane basis, accidents on the roadway, objects on the roadways, etc. The incident databases include data about the number of vehicles involved in the accident, including type (car, truck, etc.). Also included are data about how many and which lanes are blocked, the number and type of response vehicles on the scene, and the type of incident (vehicle fire, collision, disabled vehicle, etc.). An example database of the traffic flow and incident data is available from INRIX, Inc.

The earth imagery 106 may be a database of high resolution satellite images that provides spatial geography information for establishment of 3D elements from the city and building models 108 to create a digital representation of a roadway as it traverses across geographic features. Earth imagery 106 is available from the United States Geological Survey (USGS).

The city and building models 108 is a database that provides geographic positions of buildings, streets and other various ground objects. The city and building models 108 provides information about a distribution range of space, green area, and bodies of water with different overlay types. The city and building models 108 database is designed to creating highly realistic and highly accurate scenes of texture-mapped urban models. An example city and building models data base is available from PLW Modelworks.

The elevation model data 110 provides elevation information for mapping applications. For example the elevation model data 110 may be the National Elevation Dataset (NED) available from the United States Department of Agriculture (USDA). The NED is designed to provide national elevation data in a seamless form with consistent datums, elevation unit, and coordinate reference system. The elevation model data 110 provides elevation information about the elements in the city and building models 108, thus enabling the 3D simulation.

The data provided by 102-110 can be used present an accurate representation of the topological features of any location of interest modeled by data when provided to a 3D visualization rendering platform 112, which composites the information from 102-110 to create the 3D visualizations. Examples of the 3D visualizations are shown in FIGS. 4-8.

The 3D visualization rendering platform 112 is adapted to create 3D visualizations for various consumers. For example, the 3D visualization rendering platform 112 may create high definition (HD) serial digital interface (SDI) video that is provided to a house switcher 114 for use on-air 118. The 3D visualization rendering platform 112 may create digital video or social posts for web, mobile and social channels 116. An application programming interface (API) may be defined such that the digital video and/or social posts can be pushed or pulled by the web, mobile and social channels 116. For example, the 3D visualization may be provided to a special-purpose app, social media app, weather app or web browser executing on a mobile device 120. The 3D visualization presented on the mobile device 120 may be same view as presented on-air or a modified view that is adapted for the display area of the mobile device 120, as shown in FIG. 1. Although a mobile device 120 is shown in FIG. 1, the web, mobile and social channels 116 may be viewed on any computing device, such as a tablet, desktop computer, notebook computer, in-vehicle display, or an e-book reader.

Figure 2:
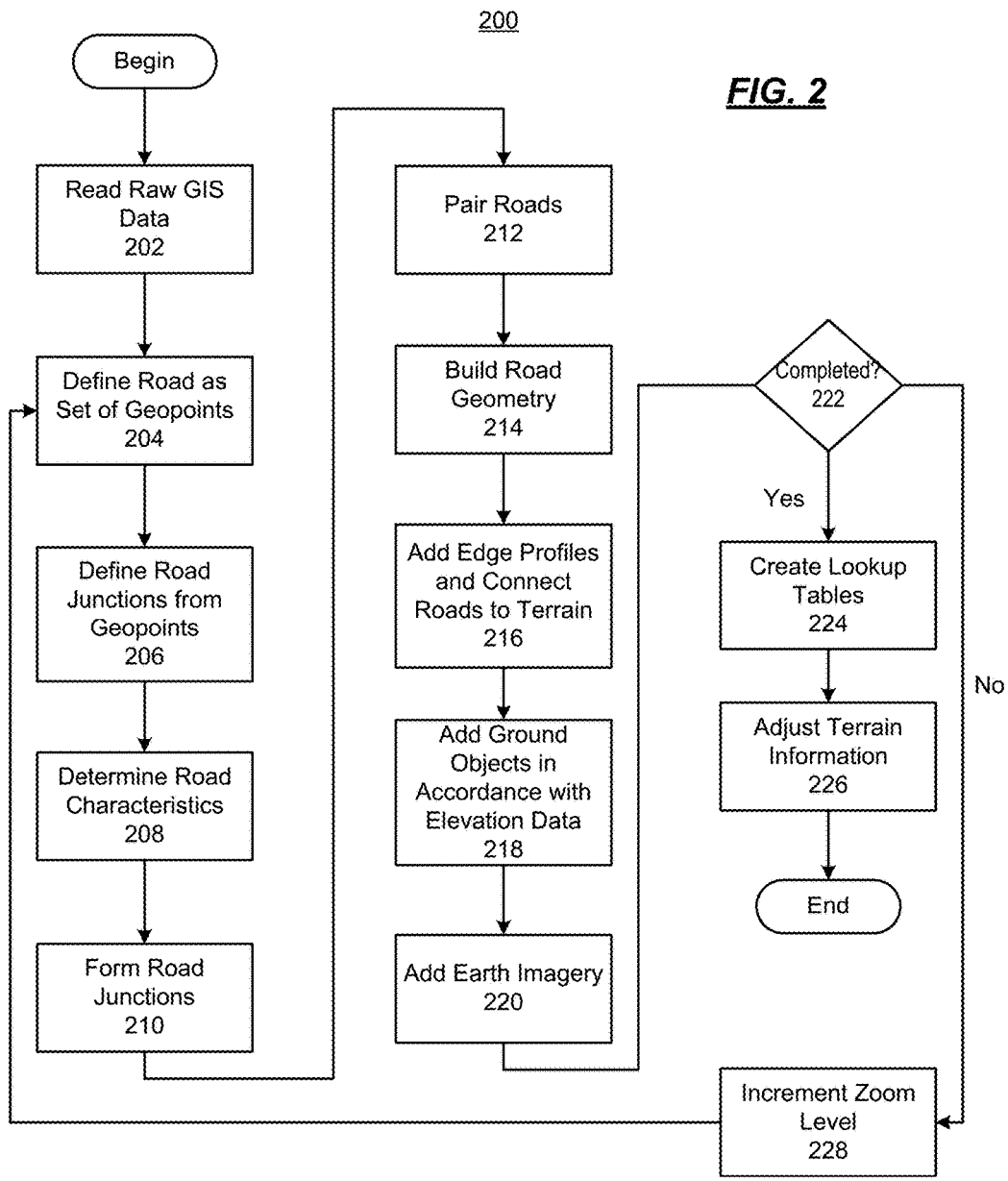
FIG. 2 illustrates an example operational flow performed by a 3D visualization rendering platform to build roads and other static information within the 3D visualization.

With reference to FIG. 2, there is illustrated an example operation flow 200 performed by the 3D visualization rendering platform 112 to build roads and other static information within the 3D visualization in accordance with the present disclosure. At 202, the raw GIS data is read by the 3D visualization rendering platform 112. For example, GIS data 102 may be read such that all of the road data for a given geographical area is ingested (e.g., a DMA sized, 50 to 100 square-miles).

In accordance with the present disclosure, the 3D visualization may be saved as a tiled file that is created having multiple zoom levels for the given geographic area. It is understood that zoom level 0 encompasses the entire Earth and each progressively higher zoom level represents the preceding zoom level divided by a multiple (e.g., 2). For example, detail in zoom level 5 may show a landmass or continent, detail in zoom level 10 may show a city, detail in zoom level 15 may show streets, and detail in zoom level 20 may show buildings. For purposes of the present disclosure, zoom levels 12-15 may be provided in the tiled file such that an end user may select a particular zoom level for display on-air 118 or on the mobile device 120. The present disclosure is not limited to zoom levels 12-15, as other zoom levels may be provided in accordance with information to be displayed.

As will be described, the operational flow 200 is processed iteratively to create the tiled file of static elements in the 3D visualization for one or more zoom levels of interest. At 204, in each iteration, the roads in the given geographic area are determined as a series of geopoints. The points may be ordered from the beginning to the end of the road for roads that exist within the GIS data for a given zoom level of interest. For example The GIS data 102 may include additional data with each point, such as the number of lanes on the road, and an elevation number (for example, 0 indicates the road is on the ground, 1 or greater indicates that the road is elevated).

At 206, road junctions are identified. For example, while reading the geopoints, any two or more roads which pass through the same point may be identified, and the roads are added to a list of junctions. A list of road segments may be created for each road. Herein, a road segment represents the range of points within a road which lie between two junctions. The road segments may be triangulated into a set of triangles that are assigned coordinates so they may be texture-mapped when the road geometry is built at 214. Once all of the road points are read in, the 3D visualization rendering platform 112 may traverse through each of the roads and calculate the current direction and distance-from-start for each point on the road. These values may be stored along with each road point.

At 208, road characteristics are determined. For example, the geopoints may be traversed a second time, and for each point, the current ground height (from sea-level) is determined by reading data from digital elevation model data 110. The ground height may be stored with each road point. Each of the junctions may be traversed to specify types of junctions, such as ramps. The edges of roads that connect to each other may also be determined. For example, to find the right or left edge of the road, the data may be examined in a direction perpendicular to the road direction. The distance moved to the left or right is based on how many lanes the road contains at any given point. Thus, a four lane road will be wider than a one lane road. Once the right/left edges have been determined for all roads, places where the road edges intersect are determined and stored.

Next, at 210, road junctions are formed. The GIS data 210 is often provided as lines, as such, all road segments in a junction meet in exactly one point. This, however, does not leave any room to actually form a road junction that closely approximates an actual road junction. Thus, in accordance the present disclosure, the road segments are moved back a predetermined distance using the intersection data determined above in order to make room for the road junction. Each road segment in the junction is stepped through and the intersection of the road edge between that road segment and the road segment immediately to the left is found. Each road segment is moved back based on how far away the edge-intersection was from the center of the junction. This is performed for each pair of adjacent road segments until the whole list of roads is traversed. The "move-back" distance is stored along with the junction information for all junctions.

At 210, it is possible that a road segment has been moved back far enough so that it bumps into another junction. In this case, these two junctions are merged. The resulting merged junction will contain all road segments from both of the original junctions, and the original junctions will be removed from the junction list. The "move back" is completed by updating the road segments. All junctions may be traversed and new points generated which are at the distance we wished to move the junction back. The road segment is associated to point to this new point.

At 212, road pairing is performed. This action identifies any roads that travel alongside each other to appropriately place median geometry. All of the road points are walked and any other points that are within a given proximity (e.g., 300 feet) are identified. All of the nearby points are stored with each road point. The road points are traversed again and each of the nearby points analyzed. If, after traversing an entire length of road, several nearby points are detected from another road, it is determined that road's direction is similar to the current road. That road is "paired" with the current road and the data stored.

At 214, the actual road geometry is built. Each of the road segments is traversed and polygons are formed based on the road edges. For each polygon, a texture is built that represents the surface of the road. Images may imported to represent textures, such as road gravel and grass for the sides of the road. Road lanes are placed parametrically based on the lane information and road properties. This is information is passed to the 3D visualization rendering platform 112 as part of a list to be drawn. A similar process is performed for junctions. Each junction in the list is traversed and a polygon is formed by connecting together each of the road edges moving counter-clockwise from the first to last road. A texture for the surface of the junction is formed, again adding the gravel and then parametrically painting any lanes on where appropriate. The texture may also include surface conditions, such as black ice, accumulated snow, flooding, or other road hazards. The textures that are generated at 214 may be composited into a single "decal" texture to enhance runtime performance.

At 216, add edge profiles are added to the polygons to show raised borders for bridges, and to make a seamless connections to the terrain for roads which are on the ground. At 218, ground objects are added, such as buildings. At 220, earth imagery is added. At this point, the identification and determination of the static information in the 3D visualization for the particular zoom level is complete. The static information in the 3D visualization may packaged into data structure as a tile together with a unique identifier so the tile may be accessed during runtime.

At 222 it is determined if all zoom levels of interest have been processed. If so, then at 224 a lookup table is created for each of the road tiles in the tiled file to provide for runtime access to the appropriate tiles as a displayed view is zoomed in or out. The lookup table may include the unique idenfier(s) created at 220. The lookup table may be prepended to the beginning of the tiled file. At 226, the terrain information may be adjusted to flatten-out areas where the roads are placed. This prevents the map terrain from "popping" above the roads in certain places. The adjusted terrain information may be saved to a secondary terrain file for use during runtime.

Figure 3:
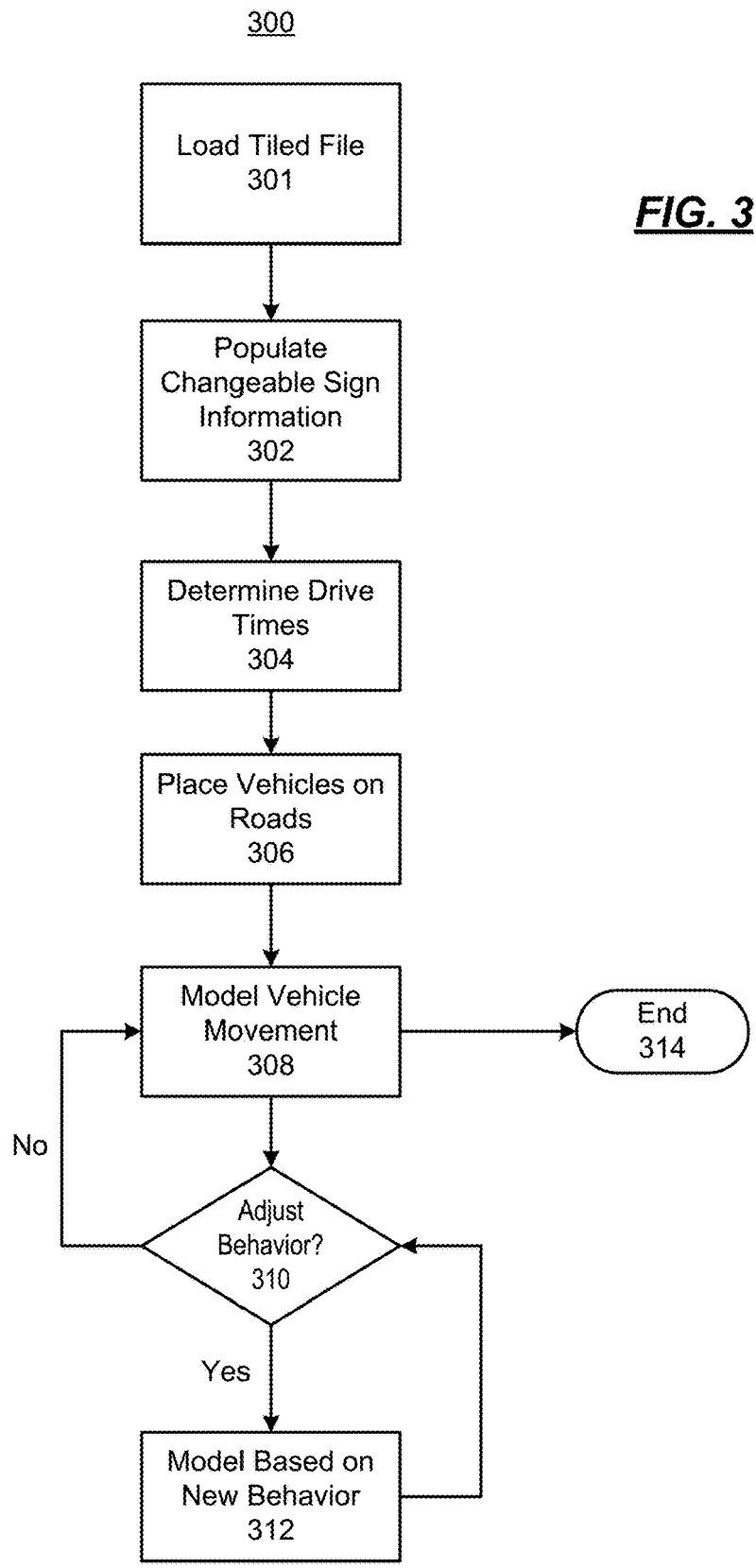
FIG. 3 illustrates an which illustrates an example operation flow performed by the 3D visualization rendering platform to represent dynamic information within the 3D visualization.

The operational flow 200 next proceeds to FIG. 3, which illustrates an example operation flow 300 performed by the 3D visualization rendering platform 112 to represent dynamic information within the 3D visualization in accordance with the present disclosure. The operational flow 300 may be performed at runtime. Initially, at 301, the tiled file may be loaded into a map scene. The appropriate tiles are loaded based on, e.g., a viewer position and orientation over the map. Once the tiles are loaded, the geometry and textures are rendered as a 3D mesh. Next, at 302, if the 3D visualization includes changeable signs, the data associated with the signs is populated to present messages on the changeable signs in the 3D visualization (see, e.g., FIG. 6). At 304, drive times may be determined such that the time from the location of interest to a second location of interest can be displayed (see, e.g., FIG. 7). Next, at 306, vehicles are placed on the roads determined above in accordance with the traffic flow and incident data 104.

In accordance with the present disclosure, the behavior of the vehicles may be adjusted to make the flows look more actual vehicle flow. For example, a slider may be provided in a user interface that enables a user to adjust the traffic flows. At one end of the scale, the traffic flow is modeled directly from the traffic flow and incident data 104. At the other end of scale, the traffic flow is adjusted to smooth-out transitions and anomalies in the traffic flow and incident data 104. If the behavior is to be adjusted at 310, the traffic flow is modeled based on the new behavior at 312. Otherwise, the modeling continues at 308. Additionally or optionally at 308, the software may be optimized to prevent 3D model vehicles from colliding with each other. Sponsorships may be embedded on moving virtual 3D vehicles. Once all of the data is processed, the operational flow ends at 314. As show in FIG. 1, the output of the process at 314 may be provided to any platform including, but not limited to, broadcast and cable television, Websites, social media, mobile apps, special purpose devices (e.g., gas pumps, kiosks), direct delivery by email, or others.

The dynamic information represented in the 3D visualization above may include the movement of traffic, changeable sign information, drive times, sponsorships and advertising, etc. The advertising may be displayed on objects such as signs, vehicles, aircraft, buildings, etc. and be changed on-demand or in a predetermined fashion in accordance with business rules. For example, is the weather is rainy, the sponsorship advertising may be changed to display merchants that sell outdoor wear. On sunny days, the sponsorship advertising may be changed to display merchants that sell gardening equipment. Other alternatives are possible given weather and traffic conditions and their relationship to advertisers. Advertisers may pay for each message displayed. In some implementations, the dynamic information may include customer-added content. For example, a local broadcaster may add content to promote local events, upcoming events, programming, etc.

Figure 4:
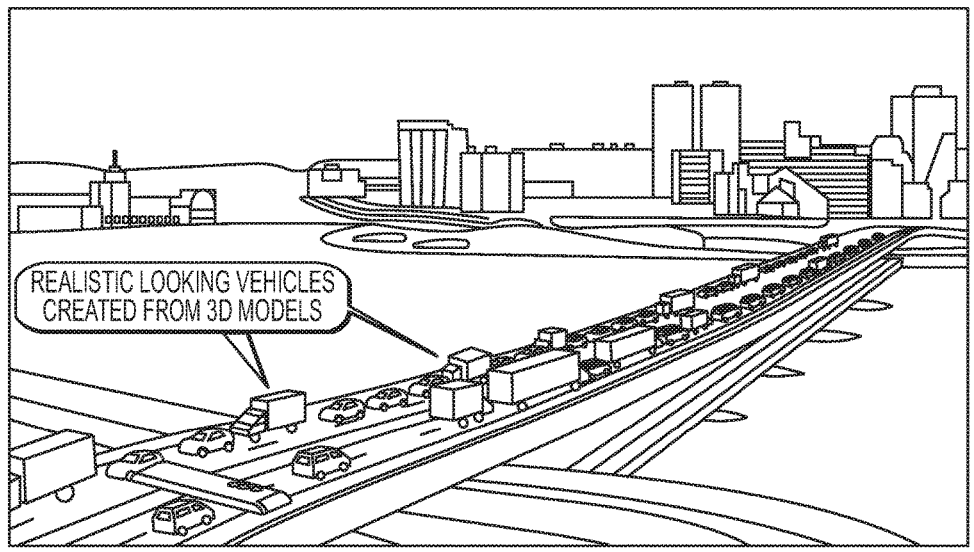
FIG. 4 illustrates an example visualization that shows vehicles having a density and speed that are driven by real traffic flow data.
Figure 5:
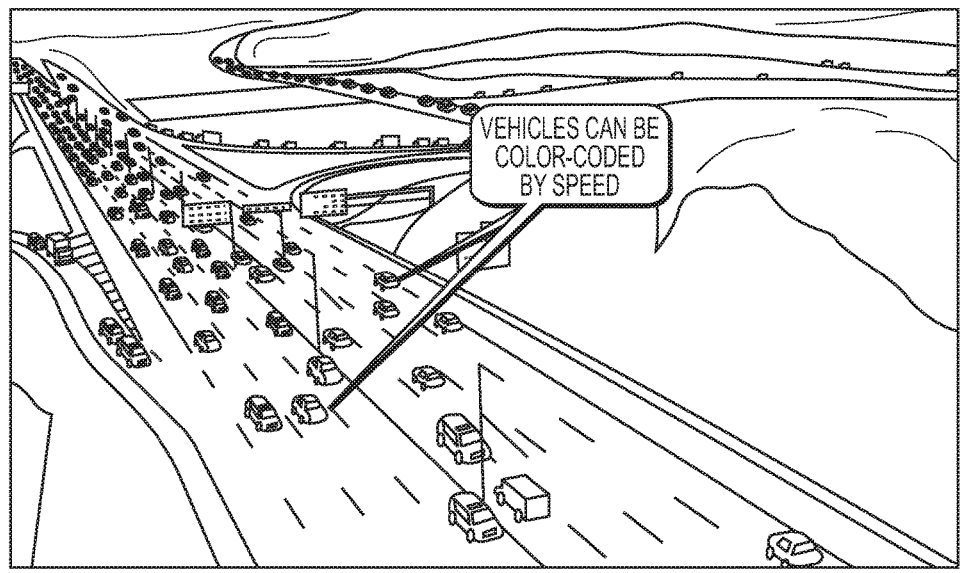
FIG. 5 illustrates an example optional color-coding of vehicles in accordance with speed.
Figure 6:
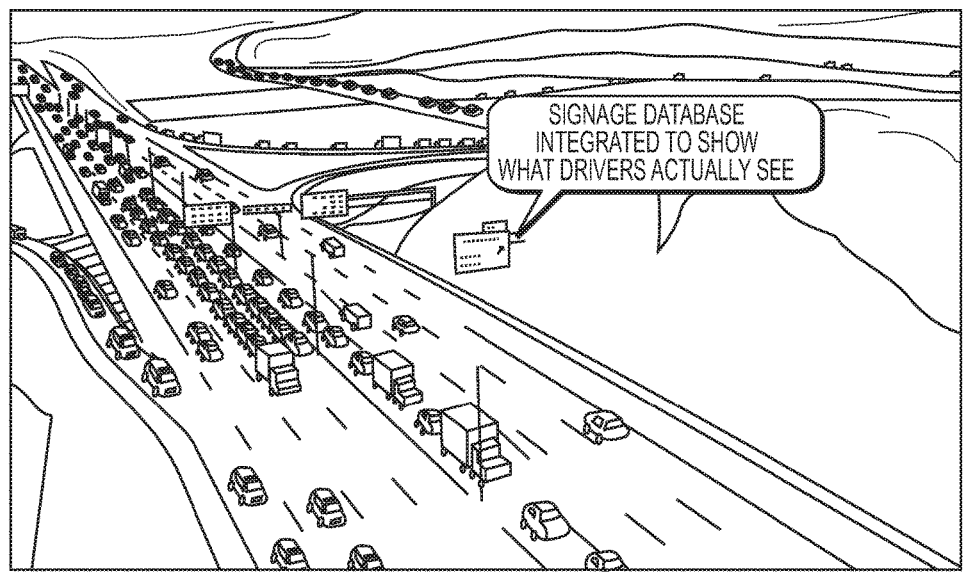
FIG. 6 illustrates an example use of sign database information to show signs as they actually appear on the road.
Figure 7:
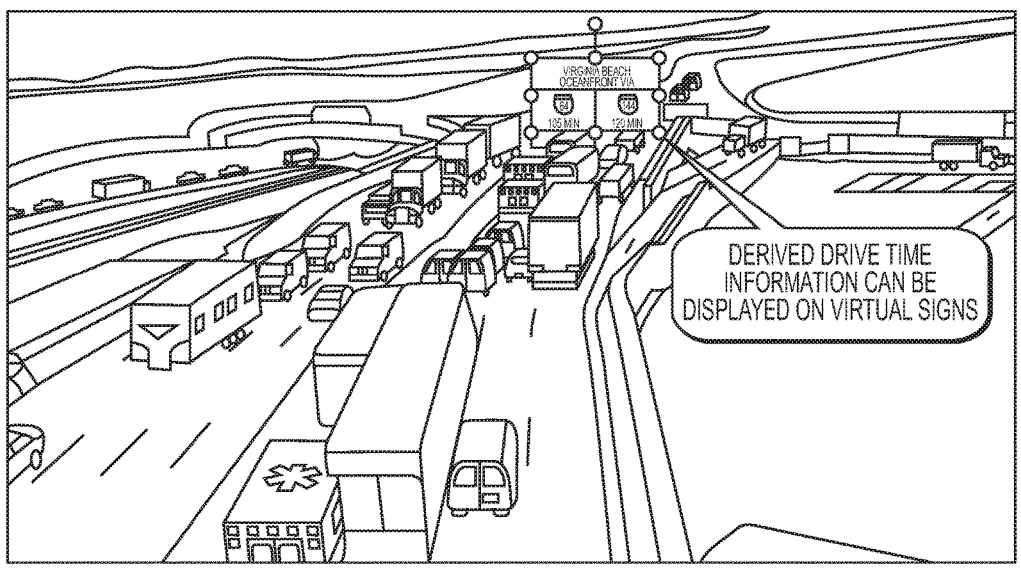
FIG. 7 illustrates an example illustration of drive times that are derived from real traffic data and displayed on road signs.
Figure 8:
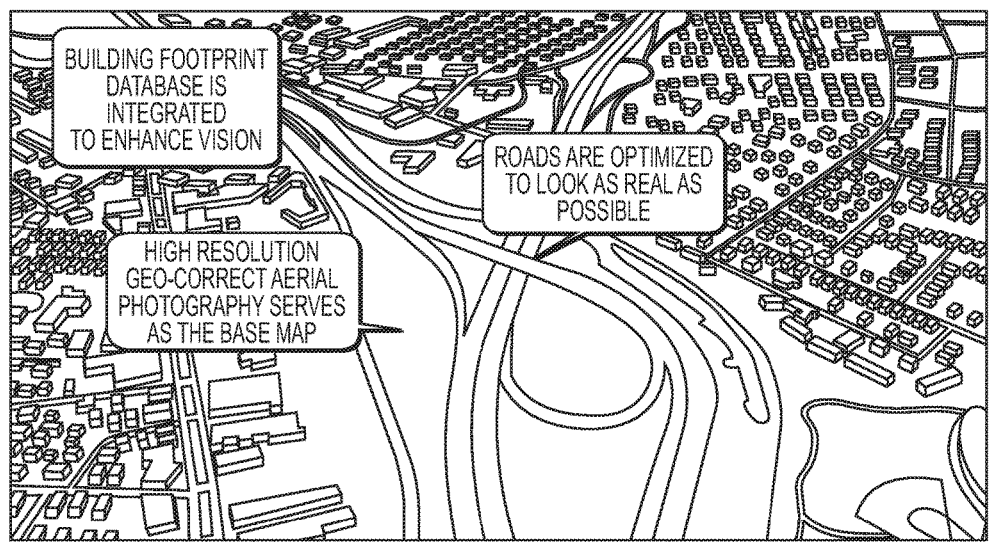
FIG. 8 illustrates an example visualization of high resolution earth data with virtual highways and a 3D cityscape.

FIGS. 4-8 illustrate example visualizations of that may be generated using the environment 100. FIG. 4 illustrates example 3D vehicles where the density and speed of the vehicles are driven by real traffic flow data. FIG. 5 illustrates example 3D vehicles that may be color-coded by speed. FIG. 6 illustrates an example visualization showing sign database information integrated into the visualization to show information as it actually appears on the road. FIG. 7 illustrates example drive times that may be included in the visualization. The drive times may be derived from real traffic data and displayed on road signs to mimic the real world. FIG. 8 illustrates example high-resolution earth data together with highways and a building footprint database to supplement 3D Cityscapes.

Thus, the 3D visualization rendering platform 112 animates the road condition based a variety of different information sources. The 3D visualization rendering platform 112 may be a high-performance workstation with the general architecture shown in FIG. 9. Varying levels of detail for the road and building data can be scaled depending on one's zoom level or "need" to see certain types of data. Roads can be color coded on the basis of a large number of characteristics such as number of lanes, road classification, tunnel or bridge, and level of service. Vehicles can be color coded.

Multivehicle collisions can be shown with responding vehicles (police cars, arrow trucks, ambulances, etc.) on the scene. This same type of visualization can be used to depict work zones. These renderings are approximations of vehicle locations based on traffic flow data and do not represent a one-to-one correlation to what may or may not be actually occurring on the road. Traffic incident database can be used to drive specific visualizations of accidents, construction, etc. As an example, if an incident indicates an overturned truck in the left lane of 3-lane highway with only the right-most lane getting by the incident, the display can include that depiction, complete with a model of an overturned truck.

In operation, to locate incidents in the system, on-air talent can easily zoom out or fly around and look for large incident icons that hover over the incident scene. Alternatively, the user can simply use a drop-down menu that shows a list of incidents and their details; a button can also be used to automatically transport the user to the incident scene. The real-time status of variable message signs can be shown in the system. Streaming AVI files from real-time CCTV feeds may augment each virtual camera location. These videos can be seen as the user flies past each CCTV tower. Additionally or optionally, weather data may be incorporated to show precipitation, cloud conditions, etc. at the location of interest.

Other types of vehicles, such as airplanes and boats can also be visualized in the program. Similarly, if one needs to know exactly where a plane or a specific vehicle is, a drop-down and search menu can be used to show the user where that particular object is located.

Figure 9:
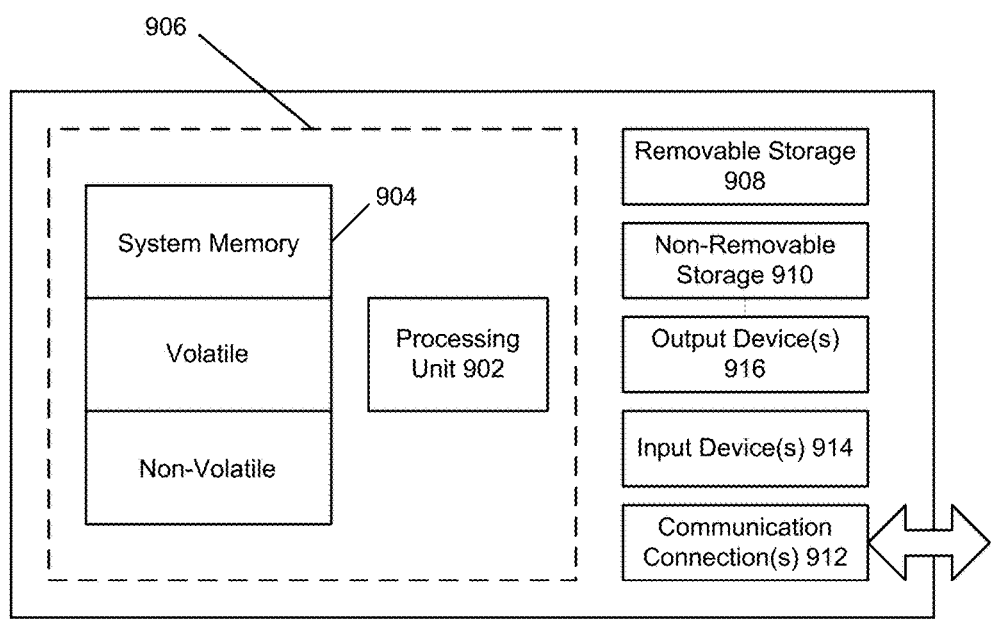
FIG. 9 illustrates an example computing device.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of tangible computer readable media. Computer readable media can be any available tangible media that can be accessed by device 900 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Tangible computer storage media include, but are not limited to, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A method for creating a three-dimensional (3D) visualization of a geographic location, comprising:
  receiving geographic information system (GIS) data that contains roadway information within the geographic location;
  receiving earth imagery associated with the geographic location; and
  for each distinct zoom level:
    defining a road geometry from the roadway information in accordance with the distinct zoom level;
    determining road segments from the roadway information to create road junctions between intersecting road segments; and
    compositing the road segments, road junctions and earth imagery into a zoom-level specific 3D visualization that is stored in a respective tile; and compositing the respective tile associated with each distinct zoom level into a tiled file to provide multiple zoom levels for the 3D visualization of the geographic area.

2. The method of claim 1, further comprising:

determining the road segments in the roadway geometry as a series of geopoints; and determining the road junctions from the geopoints.

3. The method of claim 2, further comprising determining a ground height for each geopoint from elevation data.

4. The method of claim 3, further comprising determining types of junctions from the elevation data.

5. The method of claim 2, further comprising determining edges associated with each road segment.

6. The method of claim 2, further comprising:

moving each road segment back a predetermined distance using intersection data; and pairing road segments that travel alongside each other to place median geometry.

7. The method of claim 1, further comprising:

indexing each respective tile with a unique identifier; and creating a look-up table that contains the unique identifier of each respective tile that is pre-pended to the tiled file.

8. The method of claim 1, wherein each respective tile is selectable in accordance with its unique identifier.

9. The method of claim 1, further comprising adjusting terrain information associated with the 3D visualization to flatten-out the road geometry with respect to terrain information associated with the GIS data.

10. The method of claim 1, wherein the distinct zoom level ranges from a city view to a street-level view.

* * * * *